UNITED STATES PATENT OFFICE.

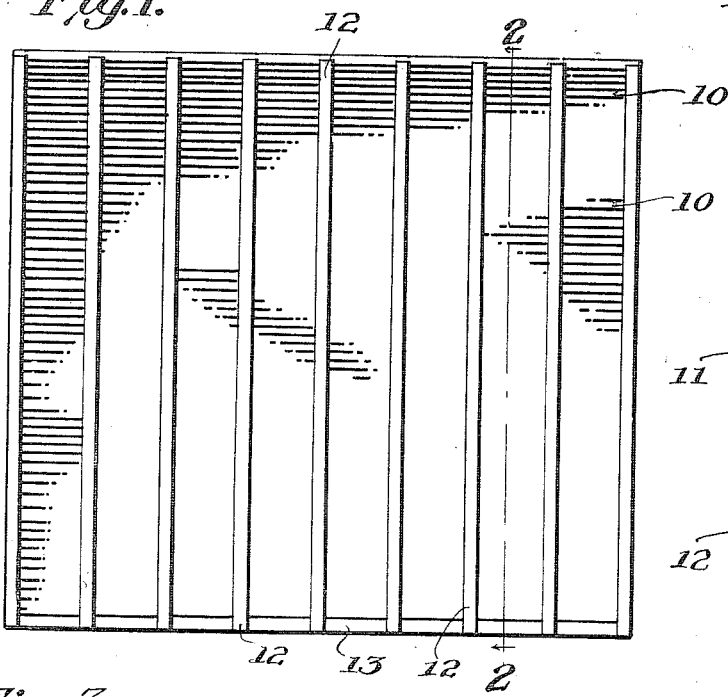
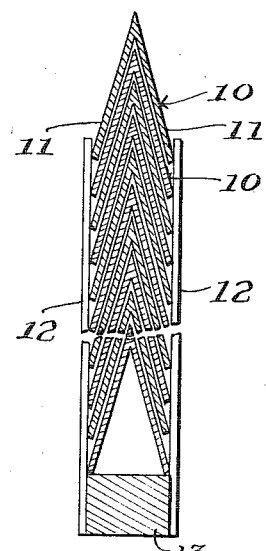
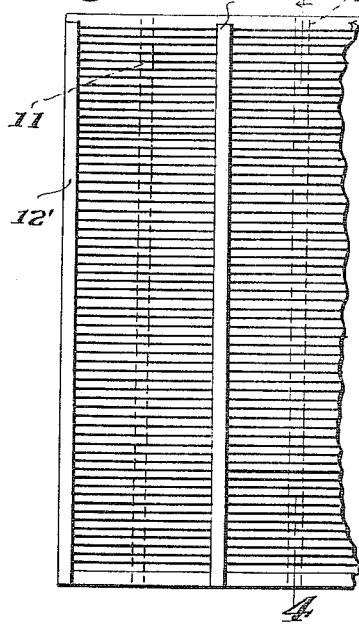
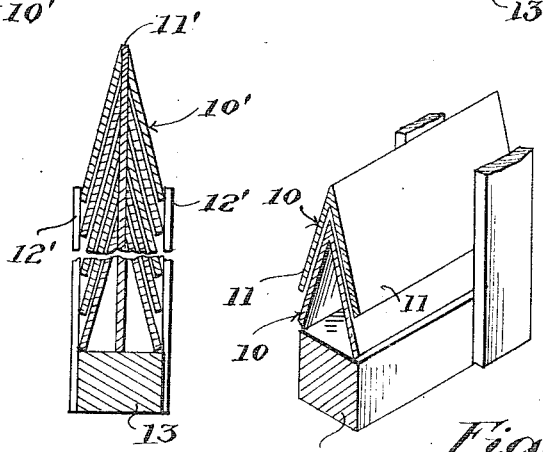

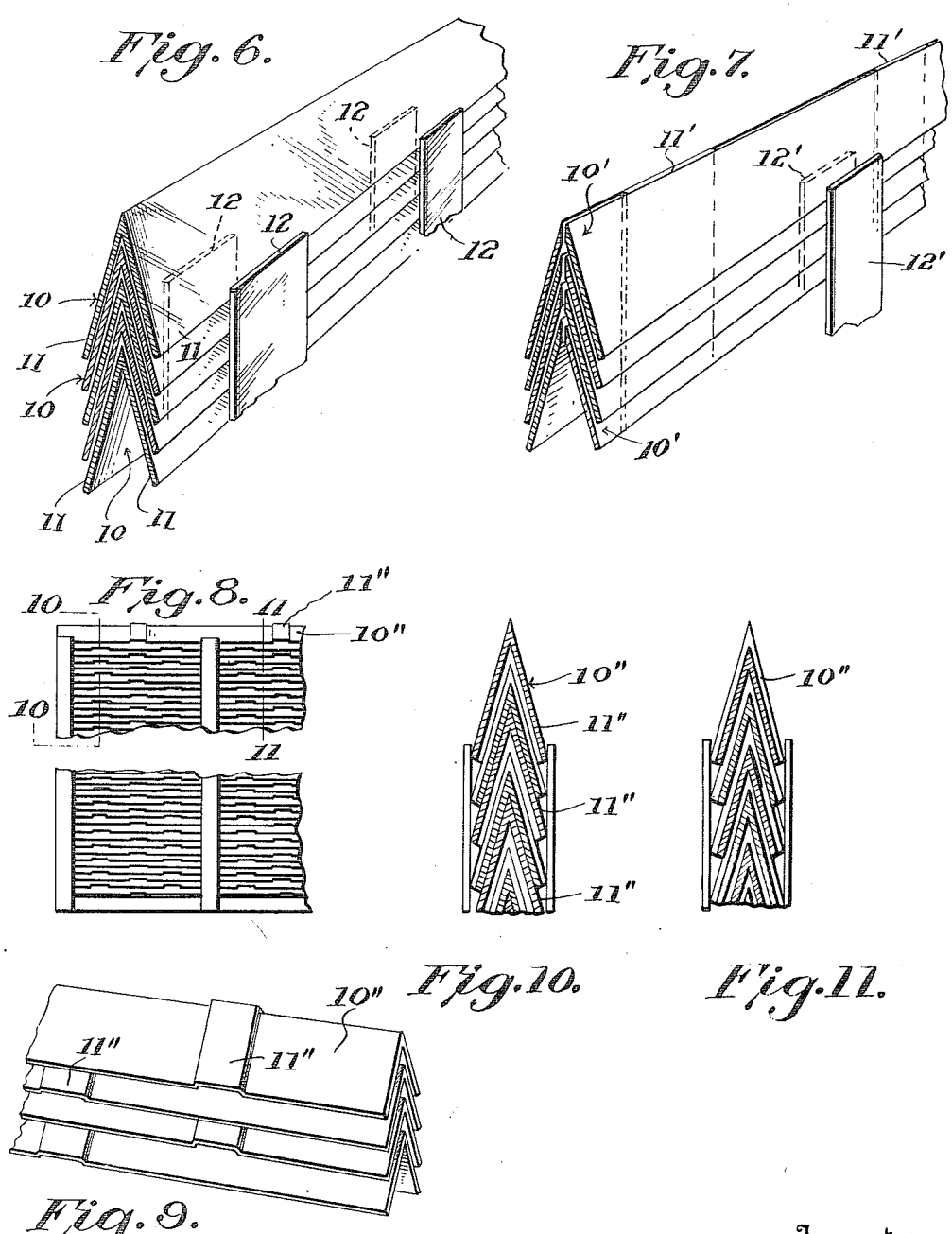

JOSEPH O. LUTHY, OF SAN ANTONIO, TEXAS.

SEPARATOR FOR SECONDARY BATTERIES.

1,305,657.　　　　Specification of Letters Patent.　　Patented June 3, 1919.

Application filed January 16, 1919. Serial No. 271,353.

*To all whom it may concern:*

Be it known that I, JOSEPH O. LUTHY, a citizen of Switzerland, residing at San Antonio, in the county of Bexar and State of Texas, have invented certain new and useful Improvements in Separators for Secondary Batteries; and I do hereby declare the following to be a full, clear, and exact description of the invention, such as will enable others skilled in the art to which it appertains to make and use the same.

This invention relates to a separator for secondary batteries.

Heretofore separators have been open to two objections. Those separators which were so constructed that the free flow of the fluid was permitted also permitted the active material to pass from one plate to the other, and on the other hand those separators which were so constructed that they tended to hold the active material in place and prevented its travel from one plate to the other, also prevented the free flow of the fluid and thus increased the internal resistance of the cell. Of course, the ideal separator is one which will offer the minimum resistance to the flow of the fluid, and yet one which will divert the flow, hold the active material in place on the plates and prevent the passage of the free active material from one plate to another.

The separator which I have invented and which forms the subject matter of this application is so constructed that it offers little resistance to the flow of the fluid and yet assists in holding the active material in place and causes the interruption and throwing down of the free active material.

In the present application I have illustrated and described the preferred form of my invention, but it is to be understood that the basic idea may be embodied in very many other forms without departing from the spirit of the invention or exceeding the scope of the claims.

In the drawings:

Figure 1 is an elevation of a separator formed in accordance with my invention;

Fig. 2 is a vertical sectional view on line 2—2 of Fig. 1;

Fig. 3 is a fragmental elevation of a modified form of separator;

Fig. 4 is a section on line 4—4 of Fig. 3;

Fig. 5 is a fragmental perspective view of the lower portion of the separator shown in Fig. 1;

Fig. 6 is a fragmental perspective view of the upper portion of said separator;

Fig. 7 is a fragmental perspective view of the upper portion of the separator shown in Fig. 3;

Fig. 8 is a fragmental elevation of a second modified form;

Fig. 9 is a fragmental perspective view of a portion of this separator;

Fig. 10 is a section on line 10—10 of Fig. 8, and

Fig. 11 is a section on line 11—11 of Fig. 8.

The embodiment of the invention illustrated in Fig. 1 is of the usual rectangular form and consists of a plurality of horizontally arranged elements 10 which are elongated and are of substantially V-shape in cross section. The wings 11 of these elements 10 diverge downwardly and the elements are arranged in superimposed relation with the wings overlapping so that the elements are, in effect, nested one within the other. The elements, therefore, form a sheet, the surfaces of which have a shutter-like appearance. A plurality of strips 12 are arranged transversely to the edges of the elements 10 and are secured thereto by adhesion, or in some other suitable manner. These strips 12 serve a dual function. They secure the elements 10 in their superimposed relation and also act to space the separator from the adjacent plates. Therefore, the fluid is free to pass between the wings 12 of the same and thus through the separator.

At the lower edge of the separator a relatively heavy bar 13 is provided, which serves as a base and also to indicate to the operator the proper position of the separator. In other words, this bar will serve to indicate the lower edge of the separator so that the operator will place the separator in the cell with the wings 12 of the elements 10 diverging downwardly. The entire device is made, preferably, of celluloid and the strips 12 are secured thereto by applying the same to portions which have been softened by a suitable solvent for the celluloid. However, it is to be understood that the device may be made of other materials, and the strips 12 may be secured in any other suitable manner.

In use the separator is placed in the cell in the usual manner, that is to say, between the plates, the elements 10 being arranged horizontally and the wings 12 diverging downwardly. The fluid in its travel from one plate to the other will pass between the overlapping wings 12 of the elements 10. This being true, it is obvious that the fluid will not travel in a straight line, but will be diverted in its travel and when the fluid is thus diverted the active material which is carried by the fluid will be thrown down and will settle in the bottom of the cell. Furthermore, because of the fact that the wings of the elements 10 diverge, the spaces will not be clogged by the material, but will, on the other hand, be kept free and thus no appreciable resistance will be encountered and no short circuiting of the cell will take place.

In the form of the invention illustrated in Fig. 3 of the drawing the elements or wings 10' are arranged in diverging relation, but are not integral with each other. They are secured to a plurality of strips 11' which are disposed between them transversely to their longitudinal edges. The outer strips 12' are disposed in a manner similar to that in which the strips are disposed in the previously described form and are secured to the elements 10' in a similar manner. In Fig. 8 I have illustrated a form of the device wherein the elements 10'' are of substantially the same general form as the elements 10. These elements 10'' are, however, provided with upstanding ribs 11'' which may be formed on or attached to the elements in any suitable manner. These ribs act to space the wings of the elements apart so that relatively larger spaces are provided between the wings in this form than are provided between the wings in the form described in the form illustrated in Fig. 1. In either form, however, the fluid will have a free passage through the separator.

From the foregoing description it will be seen that I have provided a separator which when used in a secondary battery, will afford a free passage for the fluid. Furthermore, I have so constructed the separator, that it will tend to hold the active material in place on the plates, but it will be effective to throw down the free active material. It will further be seen that because of the construction of the separator it will be impossible for the free active material to accumulate on the separator, and consequently short circuiting of the battery will be prevented.

What I claim is:—

1. A separator having passages arranged to divert the fluid in its travel therethrough.

2. A separator having regular crooked passages therethrough.

3. A separator having regular passages therethrough, and a plurality of spacing strips on the outer faces thereof.

4. A separator consisting of a series of undulatory elements arranged in nested relation with passages therebetween.

5. A separator which consists of a series of elements arranged to divert the fluid in its travel therethrough.

6. A separator which consists of a series of elements arranged to divert the fluid upwardly in its travel therethrough.

7. A separator which consists of a series of elements arranged in superimposed relation to provide regular passages therebetween.

8. A separator consisting of a series of superimposed inverted V-shaped elements.

9. A separator consisting of a series of superimposed elements having downwardly diverging wings arranged in superimposed relation.

10. A separator consisting of a series of diverging wings arranged in superimposed relation and having means thereon for spacing the same apart.

11. A separator element which is of inverted V-shape in cross section.

12. A separator element which is of invented V-shape in cross section and is provided on its upper face with transversely extending ribs.

In testimony whereof I affix my signature.

JOSEPH O. LUTHY.